US012243367B2

(12) United States Patent
Pinsdorf

(10) Patent No.: US 12,243,367 B2
(45) Date of Patent: Mar. 4, 2025

(54) ACCESS CONTROL ARRANGEMENT, READING MODULE AND ACCESS CONTROL METHOD

(71) Applicant: Robert Bosch GmbH, Stuttgart (DE)

(72) Inventor: Ulrich Pinsdorf, Herzogenrath (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 17/868,089

(22) Filed: Jul. 19, 2022

(65) Prior Publication Data

US 2023/0036382 A1 Feb. 2, 2023

(30) Foreign Application Priority Data

Jul. 20, 2021 (DE) ..................... 10 2021 207 700.5

(51) Int. Cl.
*G07C 9/28* (2020.01)

(52) U.S. Cl.
CPC ...................................... *G07C 9/28* (2020.01)

(58) Field of Classification Search
CPC ............ G07C 9/28; G07C 2009/00793; G07C 9/00182; G07C 9/00563; G07C 9/00
USPC ............................. 340/5.61, 5.7, 10.1, 10.34
See application file for complete search history.

(56) References Cited

U.S. PATENT DOCUMENTS 9,483,887 B1 * 11/2016 Soleimani .......... G07C 9/00309
10,089,810 B1 * 10/2018 Kaye .................. G07C 9/00309
10,311,664 B2 * 6/2019 Baumgarte ........ G07C 9/00563
10,521,984 B1 * 12/2019 Johansson ............. H04L 63/108
10,736,510 B2 * 8/2020 Cronin ................... G16H 40/67
10,769,877 B2 * 9/2020 Kaye ..................... H04W 48/16
10,785,742 B2 * 9/2020 Wirola ................. H04B 17/318
10,952,077 B1 * 3/2021 Holt .................... H04W 12/084
11,004,287 B2 * 5/2021 Manuse ................... G07C 9/22
11,030,835 B2 * 6/2021 Martin .................. G01S 3/8083
11,823,517 B2 * 11/2023 Haci ...................... H04N 7/181
11,833,922 B2 * 12/2023 Ahtikari .................. B60L 53/65
11,875,624 B2 * 1/2024 Studerus .................. G07C 9/10
11,887,416 B2 * 1/2024 Hoyer ...................... G07C 9/22
2012/0280783 A1 * 11/2012 Gerhardt ................ H04L 63/08
340/5.6
2017/0311161 A1 * 10/2017 Kuenzi ............. G07C 9/00904
(Continued)

FOREIGN PATENT DOCUMENTS

EP 1626372 A1 2/2006

*Primary Examiner* — Nam V Nguyen
(74) *Attorney, Agent, or Firm* — Michael Best & Friedrich LLP

(57) ABSTRACT

Access control arrangement having a reading module and at least one mobile terminal, wherein the mobile terminal comprises a coupling interface and the reading module comprises a mating interface, wherein the interface and the mating interface are configured to wirelessly connect the reading module and the mobile terminal, wherein the mobile terminal is configured to transmit an authorization notification to the reading module via the wireless connection, having a control module, wherein the control module is connected to the reading module using data technology and is configured to grant or deny access on the basis of the authorization notification transmitted to the reading module, wherein the reading module forms an active reading module for initiating the wireless connection, wherein the mobile terminal forms a peripheral device for the wireless connection.

17 Claims, 1 Drawing Sheet

(56) References Cited

U.S. PATENT DOCUMENTS

| | | | | |
|---|---|---|---|---|
| 2019/0051073 | A1* | 2/2019 | Kuenzi | G07C 9/28 |
| 2020/0160324 | A1* | 5/2020 | Mars | H04L 63/083 |

* cited by examiner

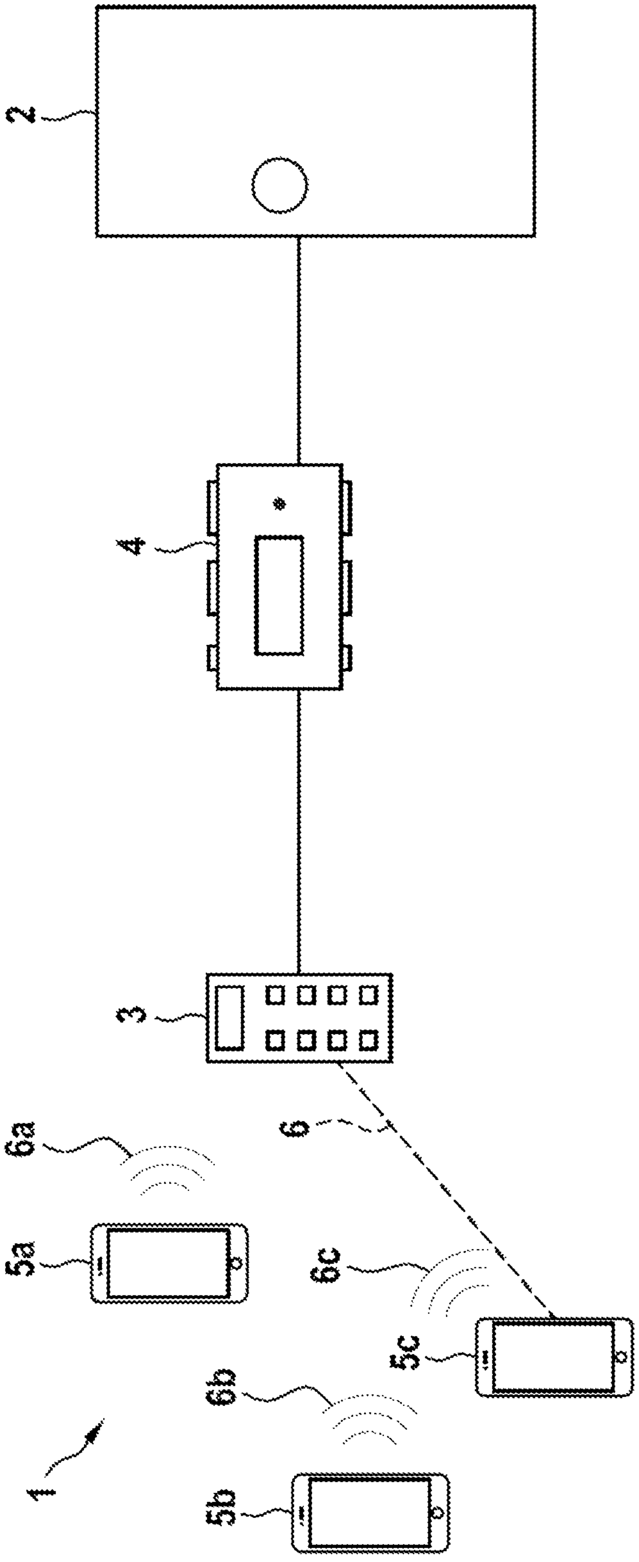
2
4
3
6
6a
5a
6c
5c
6b
5b
1

ACCESS CONTROL ARRANGEMENT, READING MODULE AND ACCESS CONTROL METHOD

BACKGROUND OF THE INVENTION

The invention relates to an access control arrangement having a reading module and at least one mobile terminal for wireless connection, wherein the terminal is designed to transmit an authorization notification to the reading module via the wireless connection. A control module of the access control arrangement is designed to grant or deny access on the basis of the authorization notification transmitted by the mobile terminal.

The published patent application EP 1 626 372 A1 describes an authorization control method and an authorization control system. The authorization control method and the apparatus suitable for it are designed to control time-dependent user authorizations. In this case, a current time is mapped to a plurality of time units of different significance by an electronic access control apparatus. The user's authorization is controlled in a mobile terminal belonging to the user, in particular on the basis of the time or the time units.

SUMMARY OF THE INVENTION

An access control arrangement is proposed. A reading module and an access control method are also proposed. Preferred and/or advantageous embodiments emerge from the subclaims, the description and the accompanying figures.

An access control arrangement is proposed. The access control arrangement is, for example, in the form of access control for a door, an airlock, an automobile, a server rack, a tool store, a portal and/or an entrance or exit. For example, the access control arrangement is designed to control access to an area, for example through a door, for example to grant or deny access to certain persons, in particular according to authorization. In particular, the access control arrangement may be designed to grant access, for example by opening and/or causing the opening of a door, an entrance or the like. The access control arrangement may be designed to control admission and/or access for an entrance, door or the like; alternatively, the access control arrangement may control access to a plurality of doors, entrances or the like, for example may form an access control network. The access control arrangement preferably comprises a reading module, in particular a plurality of reading modules. The reading modules are arranged, for example as receiving modules, in the area of the entrance, the door or the like. The reading modules are designed, for example, to read out and/or read a card, for example an access card, in particular an RFID card. In particular, provision is made for the access control arrangement to control a plurality of entrances and/or doors, wherein a reading module is preferably arranged at each entrance and/or door. In particular, the reading module is supplied with power, for example is battery-operated, rechargeable-battery-operated and is particularly preferably connected or can be connected to a power line for permanent energy supply.

The access control arrangement comprises at least one mobile terminal, in particular a plurality of mobile terminals. The mobile terminals may be identical or different, for example different device types, manufacturers or models. The mobile terminals are preferably in the form of smart devices, for example smartphones, a tablet, a computer, a smart board or the like. In particular, the mobile terminals are designed for data processing, data storage and/or user interaction. The mobile terminals are preferably battery-operated and/or rechargeable-battery-operated. In particular, the mobile terminals are or can be integrated in clothing, a wallet, a briefcase, a tool or other everyday objects.

The mobile terminal and/or the mobile terminals each comprise a coupling interface. The coupling interface is, in particular, in the form of an interface for wireless coupling, connection and/or data interchange. For example, the coupling interface is in the form of an interface for radio connection, WLAN connection, Bluetooth connection, Bluetooth low-energy connection or for optical coupling, for example infrared. In particular, the mobile terminal is designed to connect and/or couple a plurality of devices, for example at least two devices and/or less than eight. The reading module comprises a mating interface. The mating interface is designed, in particular, for coupling, connection and/or data interchange to/with the coupling interface of the terminal. For example, the mating interface forms a radio interface, a Bluetooth interface, a Bluetooth low-energy interface, a WLAN interface and/or an optical interface, for example infrared. The coupling interface and the mating coupling interface can be coupled or connected and/or are provided for interchanging data, in particular by means of a wireless connection. In particular, the mating interface can be used with a plurality of interfaces, for example at least two interfaces and/or preferably less than eight. The wireless connection is designed to connect the interface and the mating interface, in particular the mobile terminal and the reading module, in particular to connect them using data technology and/or for communication. The wireless connection forms, for example, a WLAN connection, a radio connection, an optical connection, for example an IR connection. The wireless connection is particularly preferably in the form of a Bluetooth connection, in particular a Bluetooth low-energy connection.

The mobile terminal is designed to transmit and/or make an authorization notification available to the reading module. In particular, the authorization notification is transmitted and/or made available to the reading module by means of the wireless connection. The authorization notification comprises, for example, a key, a user and/or an access authorization. The authorization notification forms, in particular, a data structure and comprises, for example, different authorization aspects, for example a location constraint, a time constraint, a frequency, a qualitative authorization, for example open but do not start an automobile, and/or a validity period. In particular, the mobile terminal is designed to transmit the authorization notification in the event of a successful wireless connection, for example in response to the successful connection set-up. It is particularly preferred for the authorization notification to be encrypted, for example for decryption in the reading module and/or a control module.

The access control arrangement comprises a control module, wherein the control module is connected to the reading module using data technology and/or forms a common module with the reading module. The control module may be, in particular, in the form of an external module, a cloud or a central computer. The reading module is designed, in particular, to provide the control module with received authorization notifications, in particular for checking, verification, decryption and/or evaluation. The reading module is preferably designed to check whether the authorization notification is intact in terms of data technology and whether it is authorized by the backend before making it available to the control module. It also checks, for example, the applicability in the specific situation, in particular whether this authorization notification is applicable to this door/this reader, whether it belongs to this mobile terminal and whether the validity is correct (already valid and not yet expired). Only when these conditions have been checked does the reading module preferably transmit the authorization notification or only parts derived (taken or calculated) therefrom to the control unit.

The control module is also designed to take the authorization notification as a basis for deciding on access, for example granting or denying access, in particular opening the door or causing the door to be opened. In particular, the control module may be designed to verify the authorization notification, to check it for authenticity and/or to match a user and a mobile terminal assigned to a user. In particular, the control module is designed to take the authorization notification as a basis for deciding on access for the mobile terminal and/or the user of the mobile terminal.

The invention is distinguished, in particular, by the configuration of the reading module and/or of the mating interface as an active module. In particular, an active reading module is understood as meaning a module which is active in the sense of the wireless connection, the connection set-up and/or the connection management. For example, in wireless networks, for example Bluetooth and/or Bluetooth low-energy connections, distinctions are made between devices, specifically central and peripheral modules, wherein active modules are designed to initialize and/or search for peripheral modules which can be used, wherein peripheral devices offer and/or communicate their service and/or their usability to the central module, for example by continuously transmitting short messages and/or data. The mobile terminal and/or the mobile terminals form(s) peripheral devices for the wireless connection, in particular as a counterpart to the central and/or active modules. For example, the distinction between peripheral and central modules of a wireless connection is known from the connection of wireless headphones and a smartphone, wherein the smartphone assumes the central and/or active role here and the headphones offer their service as peripheral modules to the smartphone.

The invention is based on the consideration that known access control arrangements situate the organization and connection of the terminal and reading module in the mobile terminal, with the result that the reading module forms a peripheral module which, in principle, offers its service as a reading module to all mobile terminals. In contrast, the present invention provides for the initiation, searching, scanning and/or connection management to be moved to the reading module, with the result that the latter assumes the central role, wherein the mobile terminals act as peripheral devices and offer only their profile, their service and/or their connection to the reading module. The access control arrangement of the invention is distinguished by its energy-saving method of operation since the mobile terminals, as peripheral devices, have a lower energy requirement since only short notifications need to be transmitted, rather than continuous searching with a particularly high energy requirement (up to 1000 milliampere hours in 5 hours), as for central modules. Furthermore, setting the reading module as an active reading module means that the reading module is not connected to mobile terminals which are not authorized, are too far away or are irrelevant, since the decision as to whether a connection to the reading module can be allowed is made by the reading module itself, with the result that the reading module can be connected only to relevant terminals. In particular, the advantage arises of no user interaction being required on the mobile terminal for granting access as a result of the use of an active reading module with passive or peripheral mobile terminals, with the result that, in order to open a door for example, the user does not have to select which door is intended to be opened on the mobile terminal, for example on the smartphone screen.

One configuration of the invention provides for the mobile terminal to be designed to offer itself to the reading module for wireless connection, in particular continuously, in a clocked manner, recurrently and/or cyclically. Alternatively and/or additionally, the mobile terminal is designed to wirelessly transmit offer notifications, in particular to generally wirelessly transmit them and/or to transmit them to mating interfaces, in particular recurrently, cyclically, in a clocked manner and/or continuously. The offer notifications are, in particular, short notifications, in particular comprising text and/or numbers, in particular a machine-readable code. The offer notifications are intended, in particular, to be received by coupling interfaces and/or wireless connection devices. Provision is also preferably made for the reading module to search, be aware of and/or evaluate the environment for the presence of mobile terminals continuously, cyclically, in a clocked manner and/or recurrently, in particular to be designed to wirelessly receive and/or evaluate offer notifications. The offer notifications comprise, for example, an item of information relating to the type of mobile terminal and the function, in particular as a connection partner for the mating interface and/or as a terminal for checking an access authorization.

One configuration of the invention provides for the access control arrangement to comprise and/or provide a plurality of mobile terminals, for example at least five and, in particular, at least ten. The mobile terminals are assigned, in particular, to different users, wherein the terminals and/or users preferably have different access authorizations. The mobile terminals may be identical, for example of the same type, for example a smartphone. The mobile terminals each comprise a coupling interface. The environment of the reading module should be understood as meaning, in particular, that the mobile terminals in this environment can be detected by the reading module, are found during scanning and/or are in range for setting up the wireless connection. In particular, in order to decide which of these mobile terminals should be used to set up the wireless connection, the access control arrangement, in particular the reading module and/or the control module, comprises a decision module. The decision module is designed and/or configured to select at least one, in particular exactly one, of the terminals from the plurality of mobile terminals, in particular as a selected terminal. The wireless connection is set up for the selected terminal, wherein the authorization notification is made available to the reading module by the selected terminal. In particular, there is no wireless connection, in particular for providing the authorization notification, to mobile terminals which have not been selected as the selected terminal. Unlike in known access control arrangements, the mobile terminal, for example a smartphone, does not decide that a connection is set up to the reading module, but rather the reading module or the decision module decides which of the plurality of mobile terminals is used to set up the wireless connection. This makes it possible to ensure, for example, that, for a limited number of wireless connections of a reading module, those mobile terminals which are not authorized and/or in principle not suitable for access control are not connected, but rather those terminals which are suitable in principle or the like.

It is particularly preferred for the decision module to be designed and/or configured to select the selected terminal on the basis of the offer notifications. For example, the decision module is provided with all offer notifications from the plurality of mobile terminals in the environment, wherein the selected terminal is selected from the terminals by evaluating the offer notifications. For example, the offer notifications comprise information relating to the type, for example smartphone or headphones, relating to the function, an access key and/or other parameters. Alternatively and/or additionally, the decision module is designed to select the selected terminal on the basis of a distance between the terminal and the reading module. For example, a distance between the terminal and the reading module, in particular between the interface and the mating interface, is determined by the decision module, the reading module and/or the control module. The distance may be based, for example, on a signal strength, further physical, data technology and/or signaling evaluations. For example, the decision module is designed to select the terminal and/or to provide those terminals for selection which are arranged particularly close or closest to the reading module. The decision module may also be designed to select the selected terminal on the basis of an access history, for example whether a maximum number of accesses is exceeded or too many accesses took place in too short a time, for example by positioning the person in the access area after access and/or after granting access, with the result that the person is still unintentionally interpreted as the closest terminal.

One configuration of the invention provides for the offer notifications to comprise a terminal identifier, manufacturer data, a transmission characteristic, an antenna characteristic, a maximum transmission strength, an average transmission strength and/or connection data. The terminal identifier is, for example, a unique identifier, for example an ID, of the mobile terminal, for example a manufacturer identifier and/or serial number. The manufacturer data comprise, for example, an item of model information, device parameters, functions and/or code numbers for the mobile terminal, for example for setting up wireless connections to the mobile terminal. The transmission characteristic is, for example, in the form of a signal characteristic, for example a conventional signal profile of such a terminal, wherein the antenna characteristic describes, for example, the radiation characteristic of the mobile terminal, for example for evaluating and/or assessing a signal profile of one of the detected mobile terminals by means of the reading module. The maximum transmission strength indicates, for example, the maximum signal strength of the mobile terminal, for example in order to make it possible to compare mobile terminals with one another. The average transmission strength is, for example, a signal strength which is determined by reading modules and/or experimentally and is received by a reading module from the mobile terminal, for example during a connection and/or at a typical distance for access control. The connection data describe and/or define, for example, parameters which are needed and/or should be complied with in order to set up the wireless connection.

One configuration of the invention provides for the access control arrangement, in particular the reading module and/or the control module, to have a preselection module. The preselection module may form, in particular, a common module with the decision module, the reading module and/or the control module. The preselection module is designed to make a preselection from the plurality of mobile terminals arranged in the environment of the reading module, for example to already exclude mobile terminals and/or to select those which can still be considered to be potential connection partners and/or can be transferred to the decision module. The preselection module determines a signal strength for the mobile terminals in the environment of the reading module, wherein the signal strength is measured, in particular, by the reading module and/or the mating interface. The preselection module is provided with the signal strength and/or measured signal strength. The preselection module is designed to exclude those mobile terminals having a signal strength of less than a threshold value from setting up the wireless connection and/or to avoid transferring them for a further decision by a decision module. The threshold value is, for example, a calculated, mathematically determined and/or averaged signal strength. In particular, the threshold value is permanently set in the reading module by an installer in order to open the doors according to the assembly situation when the mobile terminal is close enough to the reader. Alternatively and/or additionally, the preselection module is designed to forward those terminals of the plurality of terminals which have a signal strength of greater than or equal to the threshold value to the decision module. The threshold value is preferably a terminal-specific signal strength, for example the average transmission strength, which is particularly preferably transmitted in the offer notifications. This configuration is based on the consideration that mobile terminals can generate different average signal strengths at the reading module, with the result that this configuration makes it possible to prevent a mobile terminal at a greater distance from the reading module but with a stronger transmission power from being assumed to be the mobile terminal closest to the reading module even though a mobile terminal is arranged closer to the reading module but has a lower transmission power.

The access control arrangement comprises, in particular, a connection history module. The connection history module is , in particular, in the form of a storage module. The connection history module is designed, for a wireless connection which has been set up to one of the mobile terminals, to respectively capture and store the signal strength during the connection as the connection signal strength and/or to determine and/or store a connection time at which the mobile terminal is connected to the reading module. For example, the connection history module thus stores and/or determines, for each mobile terminal, the connection times, a connection strength at the connection time and/or a connection duration.

In particular, provision is made for the preselection module to be designed to exclude those mobile terminals of the plurality of mobile terminals, for which a signal strength of less than a minimum connection strength is determined by the reading module, from setting up a wireless connection. In particular, provision is made for the preselection module to be designed to provide the decision module with those mobile terminals having a signal strength of greater than or equal to the minimum connection strength as possible connection partners for a further decision. The minimum connection strength is preferably a minimum connection strength specific to the mobile terminal. The minimum connection strength preferably aims to achieve at least 80%, in particular at least 90%, and preferably at least 95%, of the connection signal strength, in particular the connection signal strength of the connection history module.

One configuration of the invention provides for the reading module and/or the control module to comprise an authorization granting module for generating an authorization data set, for example an authorization key. In particular, the authorization data set is created, provided and/or specific for/to a user, in particular a mobile terminal. The authorization data set comprises and/or describes, for example, whether or not access to certain areas can be granted. In particular, the authorization data set is included in the authorization notification. The authorization notification module is designed to generate the authorization data set. This configuration is based on the consideration of assigning the generation of authorization data sets to a central authorization granting module. The authorization key is made available to the mobile terminal, preferably via a wireless connection, for example Bluetooth.

It is particularly preferred for the wireless connection, in particular between the interface and the mating interface, the generation of the notifications and/or the storage to be based on a blockchain technology and/or to use a blockchain.

It is particularly preferred for the reading module, in particular the mating interface, to be designed for connection management, in particular to manage the wireless connection between the mobile terminal and the reading module. In particular, the initialization, set-up and/or termination of the wireless connection is/are carried out by the reading module and/or is/are caused by the reading module.

The invention further relates to a reading module, in particular for connection to at least one of the mobile terminals. The reading module comprises, in particular, a mating interface. The reading module preferably comprises the decision module, the control module and/or the preselection module. The reading module and/or the mating interface is/are designed for wireless connection to the mobile terminal; in particular, the reading module is designed to receive an authorization notification from the mobile terminal. The reading module is designed as an active reading module for initializing the wireless connection, for managing the wireless connection and/or for terminating the wireless connection. In particular, the reading module is designed to provide and/or treat mobile terminals as peripheral devices of the wireless connection.

The invention further relates to an access control method, wherein a reading module can be wirelessly connected to at least one mobile terminal. A wireless connection to a mating interface of the reading module can be set up by means of a coupling interface of the mobile terminal, wherein an authorization notification can be and/or is transmitted from the mobile terminal to the reading module via the wireless connection. The method provides for the reading module to act as an active reading module and/or to initiate and/or cause the set-up of the wireless connection between the mobile terminal and the reading module. In particular, the decision regarding which mobile terminal is used to set up the wireless connection to the reading module is made. The reading module preferably continuously searches for mobile terminals in an environment for setting up the wireless connection. In this case, the mobile terminals act as peripheral devices and/or offer their function, their profile and/or their authorization notification to the reading module or an active device and/or module. In particular, the mobile terminals offer themselves to the reading module as connection partners and/or for setting up the wireless connection. The terminal transmits the authorization notification to the reading module via a wireless connection which has been set up, wherein on the basis of the authorization notification, in particular by a control module which is connected to the reading module using data technology. The decision as to whether access is granted or denied is made on the basis of the authorization notification.

BRIEF DESCRIPTION OF THE DRAWINGS

Further advantages, effects and configurations emerge from the accompanying figure and its description. In this case:

FIG. 1 shows an exemplary embodiment of an access control device.

DETAILED DESCRIPTION

FIG. 1 shows an exemplary embodiment of an access control arrangement 1 for access control for a door 2. The access control arrangement is designed to grant or deny access to an area for a person, for example by opening a closed door 2. The access control arrangement 1 comprises a reading module 3 which is connected to a control module 4 using data technology. The control module 4 is in turn connected to the door 2 using data technology and/or functionally, for example in order to initiate the opening of the door 2 when access is granted and/or to keep the door 2 closed when access is denied. The reading module 3 comprises a mating interface for wireless connection to at least one mobile terminal 5A, 5B, 5C. The mobile terminals 5A to C are, for example, in the form of smartphones and comprise an interface for wireless connection 6, in particular to the reading module 3. The mobile terminals 5A to C are also designed to repeatedly transmit offer notifications 6A to C. The wireless connection 6 is in the form of a Bluetooth low-energy connection, in particular. The authorization notification is transmitted from the mobile terminal to the reading module 3 via the wireless Bluetooth low-energy connection, wherein this authorization notification comprises an authorization key, in particular. This may be, for example, a simple user ID, a card number or a more complex data structure. The control module is designed to provide the control module 4 with the authorization notification, in particular the authorization key, wherein this control module verifies, for example, to whom the authorization key belongs, for example whether the person to whom the authorization key belongs has access through the door. For example, the reading module 3, the control module 4 and possibly a door opener of the door 2 may form a smart lock.

The authorization key preferably comprises a digital signature and/or attributes of the key owner, for example username, employee number, status and/or special certificates. In order to open the door, the mobile terminal 5 transmits the authorization notification containing the authorization key via the wireless connection 6. Preprocessing, for example decryption, integrity checking, validity checking and/or extraction of attributes from the authorization notification, is preferably carried out in the reading module 3. This or the authorization notification or the authorization key is forwarded from the reading module to the control module 4 in order to decide whether access is granted or denied.

In order to distinguish between which mobile terminal 5A to 5C and the reading module 3 the wireless connection 6 is intended to be set up, a decision module and/or a preselection module, which is/are preferably part of the reading module 3, is/are provided. The mobile terminals 5A, 5B, 5C continuously offer themselves and/or continuously indicate their presence, in particular that they are capable of acting as a basis for access control. In this case, the mobile terminals 5A, 5B, 5C form peripheral devices, wherein the reading module 3 forms a central role and/or a central module, in particular for managing and/or initializing the connection. For this purpose, the mobile terminals 5A, 5B, 5C continuously transmit an offer notification 6A to 6C, wherein this notification comprises all necessary information for setting up the wireless connection. In particular, they comprise an address of the mobile terminal and/or packet data, wherein the packet data comprise a serial number or manufacturer data, for example. The offer notifications are used by the reading module 3 as a basis for determining whether the mobile terminal can be used as a basis for access control.

The reading module 3, as a counterpart to the peripheral mobile terminals 5A, 5B, 5C, scans environment for mobile terminals and/or scans the environment for offer notifications, wherein a preselection module selects, for example, only those mobile terminals 5A, 5B, 5C as relevant which may in principle be the basis for access control, for example excludes wireless headphones.

In particular, it may be the case that the reading module 3 receives more than one offer notification 6A, B, C, wherein the associated mobile terminals 5A, B, C are listed according to received signal strength, for example, wherein this allows the reading module 3 to make a first estimation of a distance between the reading module 3 and the mobile terminal 5A, B, C.

| Mobile terminal | Signal strength |
| --- | --- |
| 5A | 10 |
| 5B | 3 |
| 5C | 8 |

In order to decide which mobile terminal 5A to 5C should be used to set up the wireless connection 6, a connection history module, for example, records a storage of past signal strengths, wherein these were determined, in particular, during a present connection of the respective terminal 5A, 5B, 5C to the reading module 3. A median is determined on the basis of this for each mobile terminal 5A, B, C, for example.

| Mobile terminal | Determined signal strengths | Median |
| --- | --- | --- |
| 5A | 10, 8, 5, 5, 6 | 6 |
| 5B | 8, 5, 10 | 8 |
| 5C | 5, 4, 4, 7, 2 | 5 |

The preselection module may exclude, for example, those mobile terminals whose current measured signal strength (Table 1) is less than the determined median (Table 2) from the connection.

The invention claimed is:

1. An access control arrangement (1) comprising:

a reading module (3) comprising a coupling interface;

a mobile terminal (5) comprising a mating interface configured to wirelessly connect, via a wireless connection (6), to the coupling interface, the mobile terminal (5) being configured to transmit an authorization notification to the reading module (3) via the wireless connection (6); and a control module (4) connected to the reading module (3) using data technology and is configured to grant or deny access based on the authorization notification transmitted to the reading module (3), wherein the reading module (3) forms an active reading module (3) configured to search for offer notifications broadcasted by the mobile terminal (5) and determine, based on the offer notification, whether to establish the wireless connection (6) with the mobile terminal (5), wherein the mobile terminal (5) forms a peripheral device for the wireless connection (6) and the mobile terminal (5) is configured to automatically repeatedly broadcast the offer notifications, and wherein the reading module (3) establishes the wireless connection (6) with the mobile terminal (5) based on the offer notification.

2. The access control arrangement (1) according to claim 1, wherein the mobile terminal (5) is configured to offer itself to the reading module (3) for the wireless connection (6) by automatically wirelessly transmitting short offer notifications (6).

3. The access control arrangement (1) according to claim 1, wherein the reading module (3) is configured to search for a plurality of mobile terminals (5) for wireless connection (6) and to detect offer notifications (6) from the plurality of mobile terminals (5), the plurality of mobile terminals (5) including the mobile terminal (5).

4. The access control arrangement (1) according to claim 1, wherein a plurality of mobile terminals including the mobile terminal (5) are arranged in an environment of the reading module (3), wherein the reading module (3) comprises a decision module configured to select one terminal from the plurality of mobile terminals (5) as a selected terminal (5) for the wireless connection (6) to the reading module (3).

5. The access control arrangement (1) according to claim 4, wherein the decision module is configured to select the selected terminal (5) based on offer notifications (6), a distance between the terminal (5) and the reading module (3) and/or an access history.

6. The access control arrangement (1) according to claim 4, wherein the offer notifications (6) comprise at least one selected from a group consisting of a terminal identifier, manufacturer data, a transmission characteristic, an antenna characteristic, a maximum transmission strength, an average transmission strength, and connection data.

7. The access control arrangement (1) according to claim 1, wherein the reading module (3) has a preselection module, wherein the preselection module is configured to determine a signal strength for the mobile terminal (5) in the environment of the reading module (3), wherein the preselection module is configured to exclude the mobile terminal (5) from setting up the wireless connection (6) in response to determining that the mobile terminal has a signal strength of less than a threshold value from setting up the wireless connection (6) and/or to provide the decision module with the mobile terminal (5) in response to the mobile terminal (5) having a signal strength of greater than or equal to the threshold value.

8. The access control arrangement (1) according to claim 1, the access control arrangement (1) further comprising a connection history module configured, for a wireless connection (6) which has been set up, to store the signal strength as a connection signal strength for the mobile terminal (5) and/or to determine and/or store a connection time of the mobile terminal (5).

9. The access control arrangement (1) according to claim 8, wherein the preselection module is configured to exclude the mobile terminal (5) in response to the determining that the stored signal strength of the mobile terminal (5) is less than a minimum connection strength from setting up the wireless connection (6) and/or to provide the decision module with the mobile terminal (5) in response to determining that the stored signal strength of the mobile terminal (5) is greater than or equal to the minimum connection strength.

10. The access control arrangement (1) according to claim 1, wherein the reading module (3) or the control module (4) comprises an authorization granting module for generating an authorization data set and is configured to provide the mobile terminal (5) with the authorization data set, wherein the mobile terminal (5) is further configured to generate an authorization notification based on the authorization data set and provide the authorization notification to the reading module (3) via the wireless connection (6) when the wireless connection (6) is established between the reading module (3) and the mobile terminal (5).

11. The access control arrangement (1) according to claim 1, wherein the generation of the authorization key, the wireless connection (6), the authorization notifications, the offer notifications (6) and/or the storage is/are based on a blockchain.

12. The access control arrangement (1) according to claim 1, wherein the reading module (3) is configured to manage the wireless connection (6).

13. The access control arrangement (1) of claim 1, wherein the offer notifications include information regarding a type of the mobile terminal (5).

14. The access control arrangement (1) of claim 1, wherein the offer notifications include information regarding a function of the mobile terminal (5).

15. The access control arrangement (1) of claim 1, wherein the offer notifications include a unique identifier of the mobile terminal (5).

16. A reading module (3) comprising:

a mating interface, and a control module (4), wherein the reading module (3) and/or the mating interface is/are configured for wireless connection (6) to at least one mobile terminal (5), wherein the reading module (3) is configured as an active reading module (3) for initializing the wireless connection (6), for managing the wireless connection (6) and/or for terminating the wireless connection (6), wherein the control module (4) is configured to grant or deny access based on an authorization notification transmitted from the mobile terminal (5) to the reading module (3), wherein the reading module (3) forms an active reading module (3) configured to search for offer notifications automatically broadcasted by the at least one mobile terminal (5) and determine, based on the offer notification, whether to establish the wireless connection (6) with the mobile terminal (5), and wherein the mobile terminal (5) forms a peripheral device for the wireless connection (6) and the mobile terminal (5) is configured to automatically repeatedly broadcast the offer notifications.

17. An access control method, the method comprising:

connecting a reading module (3) to at least one mobile terminal (5) by means of a wireless connection, and transmitting an authorization notification from the mobile terminal (5) to the reading module (3) via the wireless connection (6), wherein the reading module (3) is in the form of an active reading module (3) that initiates, manages, and/or sets up the wireless connection (6) between the mobile terminal (5) and the reading module (3) based on the offer notification, wherein the reading module (3) is configured to search for offer notifications that are automatically repeatedly broadcasted by the mobile terminal (5) and establish the wireless connection (6) with the mobile terminal (5) based on the offer notification, and wherein the mobile terminal (5) forms a peripheral device for the wireless connection (6).

* * * * *